United States Patent
Chen et al.

(10) Patent No.: US 8,225,116 B2
(45) Date of Patent: Jul. 17, 2012

(54) POWER SUPPLY SYSTEM ELECTRONIC CARD AND METHOD FOR SUPPLYING POWER TO THE ELECTRONIC CARD

(75) Inventors: Cheng Chen, Shenzhen (CN); Feng Hong, Shenzhen (CN); Shanfu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 640 days.

(21) Appl. No.: 12/341,820

(22) Filed: Dec. 22, 2008

(65) Prior Publication Data

US 2009/0144569 A1 Jun. 4, 2009

(51) Int. Cl.
*G06F 1/00* (2006.01)
(52) U.S. Cl. ........................................... 713/310
(58) Field of Classification Search .................. 713/300, 713/310
See application file for complete search history.

(56) References Cited

U.S. PATENT DOCUMENTS

| | | | |
|---|---|---|---|
| 6,104,967 A * | 8/2000 | Hagen et al. .................. | 700/293 |
| 6,448,672 B1 | 9/2002 | Voegeli et al. | |
| 2004/0025064 A1 | 2/2004 | Felsman | |
| 2006/0206582 A1 * | 9/2006 | Finn .............................. | 709/217 |
| 2006/0221588 A1 | 10/2006 | Summers et al. | |
| 2006/0223343 A1 | 10/2006 | Campini et al. | |

FOREIGN PATENT DOCUMENTS

CN 1829007 A 9/2006

OTHER PUBLICATIONS

Office Action issued in corresponding Chinese Patent Application No. 2006101617216; issued Feb. 12, 2010.
International Search Report issued in corresponding PCT Application No. PCT/CN2007/071197; mailed Mar. 20, 2008.
PCI Industrial Computer Manufacturers Group: "PICMG AMC.0 Advanced Mezzanine Card Short Form Specification" : Jun. 15, 2004; Retrieved from the internet URL:http://www/picmg.org/pdf/AMC_D0.9_Short_spec.pdf> ; Retrieved Apr. 19, 2006.
International Preliminary Report on Patentability issued in corresponding PCT Application PCT/CN2007/071197; issued Jun. 16, 2009.
Supplementary Search Report issued in corresponding European Patent Application No. 07 84 6043; issued Dec. 16, 2009.
Communication Pursuance to Article 94(3) EPC, Application No. 07 846 043.3-1243, dated Oct. 27, 2011, 6 pages.

* cited by examiner

*Primary Examiner* — Mohammed Rehman
(74) *Attorney, Agent, or Firm* — Slater & Matsil, L.L.P.

(57) ABSTRACT

A communication device includes a power supply system, the power supply system includes: an MCH, a power module, and at least one AMC module. The AMC module is adapted to send a load power supply control command according to a received load power supply control request. The power module is adapted to receive input of external power supply, and provide management power supply and load power supply after converting the input of external power supply. The at least one Advanced Mezzanine Card (AMC) module is adapted to send the load power control request to the MCH, receive the load power supply control command sent by the MCH, and control provision of the load power supply of the power module according to the load power supply control command.

12 Claims, 8 Drawing Sheets

POWER SUPPLY SYSTEM ELECTRONIC CARD AND METHOD FOR SUPPLYING POWER TO THE ELECTRONIC CARD

FIELD OF THE DISCLOSURE

The present disclosure relates to communication device technologies and in particular to a communication device, an Advanced Mezzanine Card (AMC), and a method for supplying power to the AMC.

BACKGROUND OF THE DISCLOSURE

Advanced Telecommunications Computing Architecture (ATCA) is an open industrial standard architecture formulated and developed by the PCI Industrial Computer Manufactures Group (PICMG). It is universal hardware platform technology of communication devices and computer servers. Communication devices and computer servers that meet various needs can be constructed according to various ATCA-based modules. Micro Telecommunications Computing Architecture (MicroTCA) is a small universal telecom and computing hardware platform technology formulated by the PICMG. The MicroTCA uses an AMC to construct a system, and a hot-swappable AMC may be inserted into the backplane of the MicroTCA directly. The MicroTCA is oriented to low- and mid-end telecom or computing applications which are sensitive to costs and require a small physical size.

FIG. 1 shows a structure of a power supply system of an AMC module in a MicroTCA system in the prior art. The power supply system 100 includes at least one AMC module 140, a MicroTCA Carrier Hub (MCH) 110, a power module 130, and a backplane 120. Each AMC module includes a Module Management Controller (MMC) 141 and a load circuit 142.

In the system shown in FIG. 1, each AMC sends an in-position signal to the Enhanced Module Management Controller (EMMC) of the power module, and declares the in-position state of the AMC module 140 according to the in-position signal. The MCH 110 is a switching and control center of the MicroTCA, and the MCH 110 controls and manages other modules of the MicroTCA system according to an Intelligent Platform Management Bus (IPMB). A MicroTCA Carrier Management Controller (MCMC) 111 of the MCH 110 in FIG. 1 is connected to the MMC 141 of the AMC module 140 according to an IPMB-L bus for managing and controlling the AMC module 140; the MCMC 111 is connected to a EMMC 131 according to an IPMB-0 bus for managing and controlling the power supply 130. The power module 130 includes a power converting module 132, an EMMC 131 and an AMC power control circuit module 133 which controls the power supply of the AMC module 140. A quantity of the AMC power control circuit modules 133 corresponds to a quantity of the AMCs. A power converting module 132 receives input of external power supply, and outputs converted power supply to the AMC power control circuit module 133. The AMC power control circuit module 133 includes a load power control circuit 135 and a management power control circuit 134, which receive load power supply and management power supply output by the power converting module 132 respectively, and output the load power supply and the management power supply to the MMC 141 and the load circuit 142 of the AMC module 140 respectively under control of the load power control signal and management power control signal output by the EMMC 131.

The process of controlling the power supply of the AMC module according to a system shown in FIG. 1 includes: controlling the power supply of the AMC module in the process of plugging and unplugging the AMC module.

During the management and control for the power supply of the AMC module 140 which is being plugged, the EMMC 131 needs to enable the management power supply control signal of the corresponding AMC power control circuit module 133 when receiving a command from the MCMC 111 which requires provision of management power supply of the AMC module 140, so that the management power supply control circuit 134 enables the output of the management power supply. After receiving a command from the MCMC 111 which provides the load power supply to the AMC module 140, the EMMC 131 needs to enable the load power supply control signal of the corresponding AMC power control circuit module 133, so that the load power control circuit 135 can enable output of the load power supply and output power supply to the load circuit 142 of the AMC module 140.

During the management and control for the power supply of an AMC module 140 which is being unplugged, the EMMC 131 needs to disable the load power supply control signal of the corresponding AMC power control circuit module 133 when receiving a command which requires shutdown of load power supply to the AMC module 140, so as to control the load power control circuit 135 of the power module 130 to disable the load power output. After detecting that the AMC module 140 is unplugged, the EMMC 131 needs to disable the management power control signal of the corresponding AMC power control circuit module 133, so as to control the management power control circuit 134 to shut down output of the management power supply.

As described above, the AMC module in the prior art does not involve the management and control circuit of the power supply. In order to make the SMC module hot-swappable, a control circuit must be set on the power supply to manage the power supply of each AMC module. Therefore, the power supply to the AMC module can only adopt a star topology. However, the design of the Printed Circuit Board (PCB) of a star topology is rather difficult. Meanwhile, if a control circuit board is set for each AMC module in the power module, the power module is more complex and less reliable.

Regarding the management on power supply to the AMC module, the prior art manages the power supply to the AMC module in a complex process which requires interaction between multiple modules such as the AMC module, the MCH and the power module. Consequently, the software is more complex and less reliable.

SUMMARY OF THE DISCLOSURE

In order to solve the foregoing problems, an embodiment of the present application provides a simple communication device for managing power supply.

An embodiment of the present application also provides an Advanced Mezzanine Card (AMC) capable of managing power supply.

Further, an embodiment of the present application provides a method for supplying power to the AMC.

A communication device includes a power supply system, the power supply system further includes a MicroTCA Carrier Hub (MCH) module, adapted to send a load power supply control command according to the received load power supply control request; a power module, adapted to receive input of external power supply, provide load power supply after converting the input of external power supply; and at least an AMC module, adapted to send the load power supply control request to the MCH; receive the load power supply control command sent by the MCH; and control provision of a load power supply of the power module according to the load power supply control command.

Each AMC module includes a Module Management Controller (MMC), adapted to send the load power supply control request to the MCH, receive the load power supply control command sent by the MCH, and send a load power enabling signal according to the load power supply control command; and a load power supply enabling circuit, adapted to obtain the load power supply, and control the load power supply provided by the power module to the load circuit of the AMC module according to the load power enabling signal received from the MMC.

The MMC is further adapted to notify the MCH that the AMC module is in position according to an in-position signal.

The power module is adapted to provide the management power supply after converting; the MMC is further adapted to obtain management power supply from the power module and manage relevant circuit power-on work.

The power module includes a power converting module and an Enhanced Module Management Controller (EMMC), the power converting module is adapted to receive input of external power supply, convert the input of the external power supply into the load power supply and the management power supply, and provide to the load power enabling circuit and the MMC respectively; the EMMC is adapted to receive the in-position signals sent by the AMC module when inserting into the system, and report an AMC insertion event to the MCH.

The MCH is further adapted to send a command of providing management power supply to the EMMC after receiving the in-position signal of the AMC module; the EMMC is further adapted to instruct the management power control circuit to provide management power supply for the corresponding MMC after receiving the command of providing management power supply; control the management power control circuit to shut down output of the management power supply after detecting that the AMC module is unplugged; instruct the load power control circuit to provide load power supply for the corresponding load circuit after receiving a request of providing load power supply; instruct the load power control circuit to shut down the output of the load power supply after receiving a request of shutting down load power supply; the power module further includes: a management power supply circuit is adapted to control the management power supply according to a received command of providing or shutting down the management power supply; a load power control circuit is adapted to turn on or shut down output of the load power supply according to the command of providing or shutting down the load power supply.

The power supply system further includes at least one ordinary AMC module, and the at least one ordinary AMC module includes the MMC and the load circuit; the MMC of the ordinary AMC module is connected to the management power control circuit; the load circuit of the ordinary AMC module is connected to the load power control circuit.

The system further includes a backplane. The power module and the MCH are connected to the at least one AMC module or the at least one ordinary AMC module according to the backplane.

The MCH is further adapted to query the MMC whether the load power supply is required after knowing that the AMC module is in position; the MMC is further adapted to send a load power supply control request to the MCH after determining that load power supply is required.

An Advanced Mezzanine Card (AMC) includes an MMC, a load circuit, and a load power enabling circuit, the AMC further comprising a load power enabling circuit. The MMC is adapted to send a load power control request to the MCH, receive the power supply control command sent by the MCH, and send a load power enabling signal to the load power enabling circuit according to the received power supply control command; the load power enabling circuit is adapted to obtain load power supply, and control the load power supply provided to the load circuit according to the received load power enabling signal.

The MMC is further adapted to obtain management power supply and manage the relevant circuit power-on work.

A method for supplying power to the AMC includes: obtaining, by an AMC module, management power supply from a power module and managing the relevant circuit of the AMC module power-on work when or after inserting an AMC module into the system by the MMC module; sending, by the AMC module, a request for providing load power supply to an MCH, wherein the request carries a load power requirement of the AMC module; sending, by the MCH, a command for allowing provision of load power supply to the AMC module; and enabling, by the AMC module, the load power output according to the received command in order to receive the load power supply provided by the power module; sending, by the MCH, the command for allowing provision of load power supply to the AMC module, after determining that the power module is able to meet the load power requirement of the AMC module.

The method further includes notifying, by the AMC module, the power module that the AMC module is in position, and reporting, by the power module, an AMC insertion event to the MCH after knowing that the AMC module is in position; or notifying, by the AMC module, the MCH that the AMC module is in position; querying, by the MCH, the AMC whether load power supply is required after knowing that the AMC module is in position; and sending, by the AMC, a load power supply request to the MCH after determining that load power supply is required.

The method further includes: determining, by the MCH, a power supply mode of a slot insert by the AMC module and performing following steps after determining that the power supply mode is a star topology supply mode; sending, by the MCH, a command to the power module, requiring provision of management power supply for the AMC module; providing, by the power module, the management power supply for the AMC module, and managing, by the AMC module, the relevant work of circuit power-on; sending, by the AMC module, a request for providing a load power supply to the MCH, carrying a load power supply requirement; instructing, by the MCH, the power module, to provide load power supply after determining that the power module is able to meet the load power requirement of the AMC module; and providing, by the power module, the load power supply for the AMC module according to the received command.

The method further includes determining, by the MCH, a type of a currently inserted AMC module; if the currently inserted AMC module is the AMC module, instructing the AMC module to turn on the load power path by the MCH.

The method includes the following steps: sending, by the AMC module, an unplugging request to the MCH after detecting the unplugging request in a process of unplugging the AMC module out of the system; sending, by the MCH, a command for allowing shutdown of load power supply to the AMC module after receiving the unplugging request; and shutting down, by the AMC module, the load power output after receiving a command that allows shutdown of load power supply.

After sending an unplugging request to the MCH, the method further includes: determining, by the MCH, the power supply mode of the slot that contains the AMC module; and if the power supply mode is a star supply mode, performing the following steps: instructing, by the MCH, the power module to shut down load power supply; shutting down, by the power module, the load power supply provided to the AMC module according to the received command; and shutting down, by the power module, the management power supply provided to the AMC module after determining that the AMC module is unplugged.

The method further includes reporting, by the power module, the AMC unplugging event to the MCH after determining that AMC module is unplugged according to the in-position signal.

The foregoing AMC system adds a load power supply enabling circuit in the AMC module, avoids the trouble of setting a power control circuit for each AMC module in the power module. As a result, the AMC module supports the power supply of a bus topology, thus simplifying the power supply control process greatly, reducing the complexity of upgrading the power module and the whole PCB, and improving the reliability of the power module and the whole PCB.

DETAILED DESCRIPTION

In order to make the objectives, technical solution and merits of the present application clearer, a detailed description is hereinafter given with reference to accompanying drawings and certain embodiments.

The core idea of a communication device, an AMC and a method for supplying power to the AMC provided in embodiments disclosed in the present application are: adding a load power enabling circuit in an AMC module in order to avoid the trouble of setting a power control circuit for each AMC module in the power module and make the AMC module support the power supply in a bus topology.

A communication device provided in an embodiment disclosed in the present application includes a power supply system. The power supply system further includes an MCH, a power module, and at least one AMC module.

The MCH sends a load power supply control command to the AMC module according to a received load power control request.

The power module receives an input of external power supply, and outputs a converted power supply to the AMC module.

The AMC module sends a load power control request to the MCH; receives a power supply control command from the MCH; and controls the power supply provided by the power module according to the received power supply control command.

The system also includes a backplane. The MCH, the power module and at least one AMC module are connected according to a backplane for exchanging information.

If backup redundancy is supported, the system further includes multiple power modules and multiple MCHs which have the same connection relations and functions as the aforementioned power modules and MCHs.

It is the MCMC in the MCH that implements the foregoing functions.

Figure 1:
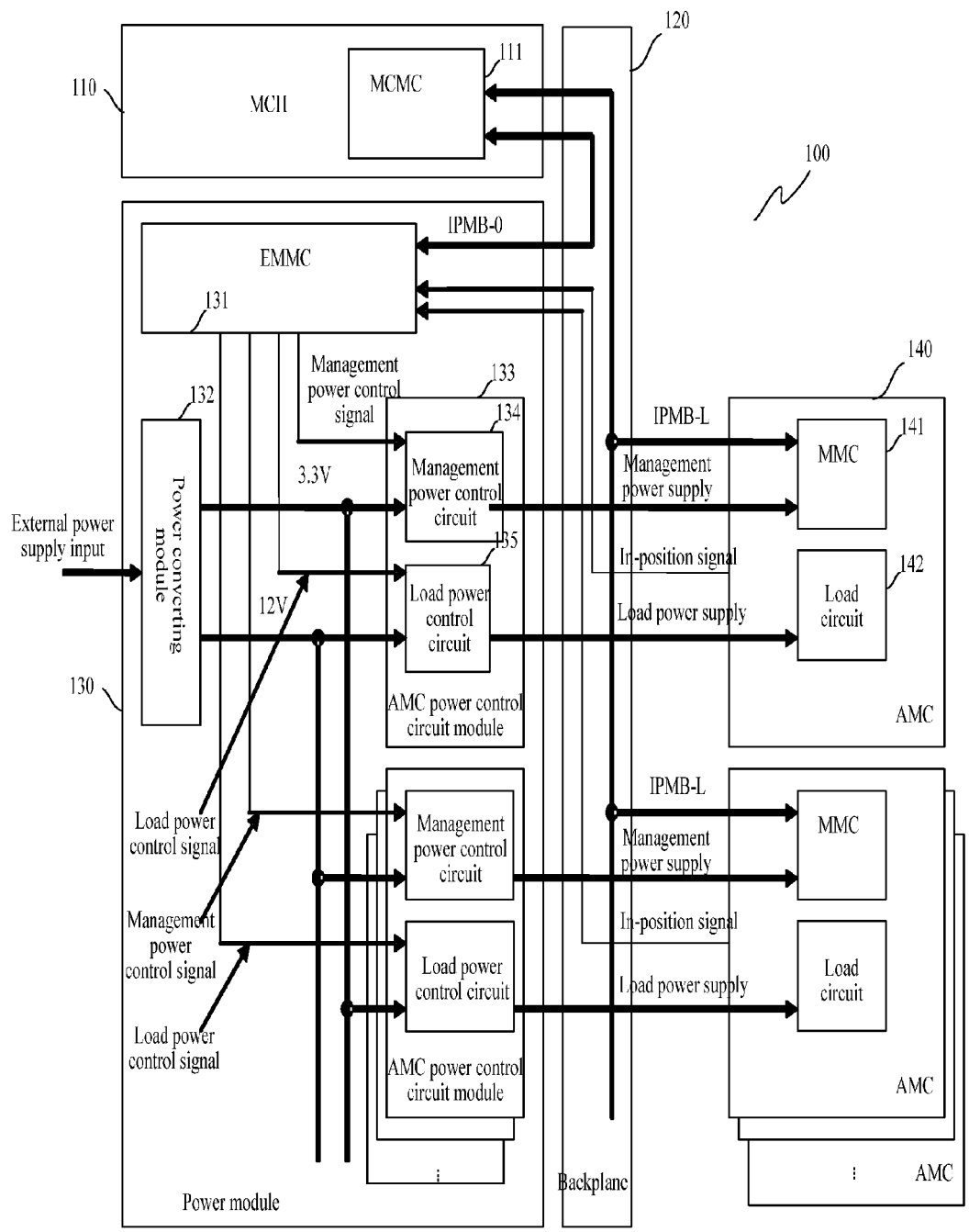
FIG. 1 shows the structure of a power supply control system of an AMC module in a MicroTCA system in the prior art.
Figure 2:
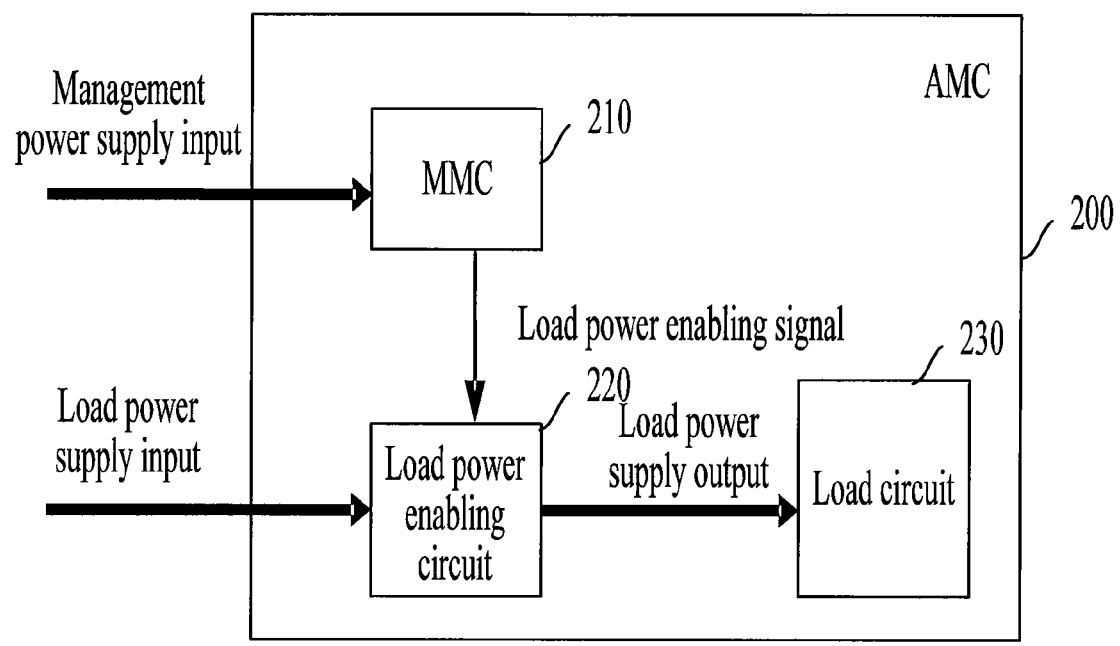
FIG. 2 shows the structure of an AMC module in an embodiment of the present application.

FIG. 2 shows the structure of an AMC module 200 in an embodiment disclosed in the present application. The AMC module 200 includes: an MMC 210, a load power enabling circuit 220, and a load circuit 230.

The MMC 210 is adapted to send the load power control request to the MCH, receive the power supply control command from the MCH, and send load power enabling signals to the load power enabling circuit 220 according to the received power supply control command;

The load power enabling circuit 220 is adapted to obtain power supply from a power bus, and control the power supply to the load circuit 230 according to the received load power enabling signal.

An input side of the load power enabling circuit 220 is connected to a load power supply of the power module according to a backplane, another input side is connected to the MMC 210, and the output side is connected to the load circuit 230.

The power supply control command is a command that allows the load power supply to provide power supply for the load circuit 230, or a command that allows shutdown of the power supply provided by the load power supply to the load circuit 230.

Figure 3:
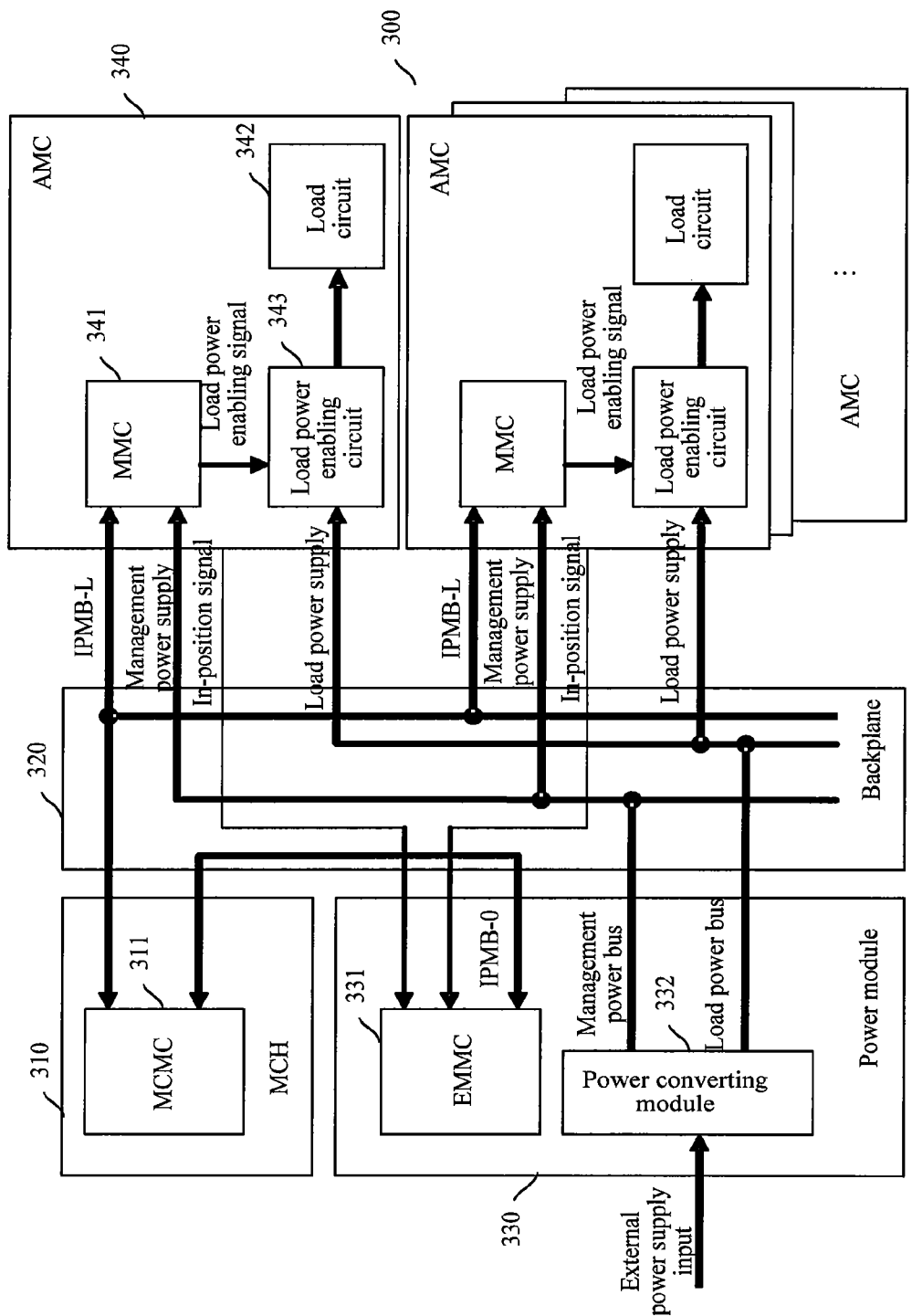
FIG. 3 shows the structure of an AMC power supply system in an embodiment of the present application.

FIG. 3 shows the structure of an AMC power supply system 300 in an embodiment disclosed in the present application. The power supply system 300 includes: an MCH 310, a power module 330, a backplane 320, and at least one AMC module 340. The MCH 310 includes: an MCMC 311; the power module 330 includes: an EMMC 331, and a power converting module 332; each AMC module 340 includes: an MMC 341, a load power enabling circuit 343, and a load circuit 342.

The MCMC 311 of the MCH 310 sends the load power supply control command to the MMC 341 of the AMC module 340 according to the received load power control request.

The power converting module 332 of the power module 330 receives input of external power supply, and outputs the converted power supply to the management power bus and the load power bus respectively.

The EMMC 331 of the power module 330 is adapted to receive in-position signal sent when the AMC module 340 is inserted into the system, and report the AMC module insertion event to the MCMC 311 of the MCH 310 according to an IPMB-0 bus.

The MMC 341 of the AMC module 340 is adapted to send the load power control request to the MCH 310, receive the power supply control command from the MCH 310, and send load power enabling signals to the load power enabling circuit 343 according to the received power supply control command;

The load power enabling circuit 343 is adapted to obtain power supply from the power bus, and control the power supply to the load circuit 342 according to the received load power enabling signal.

Figure 4:
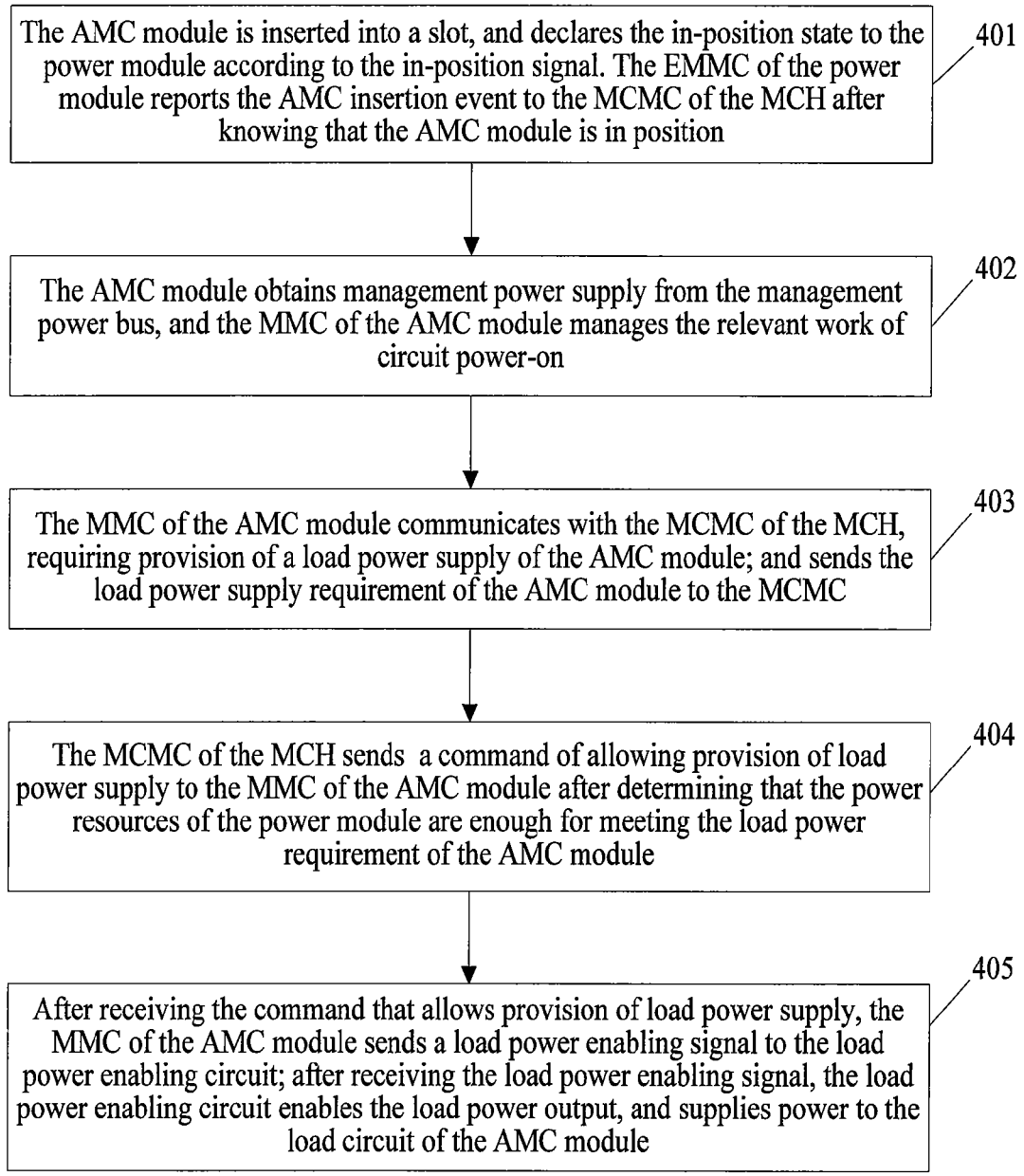
FIG. 4 is a flow chart of the method for managing the power supply of an AMC module in the process of inserting an AMC module into the system shown in FIG. 3.

FIG. 4 is a flow chart of the method for managing the power supply of an AMC module in the process of inserting an AMC module into the system shown in FIG. 3. The method includes the following steps:

Step 401: The AMC module 340 is inserted into a slot, and declares the in-position state to the power module 330 according to the in-position signal. The EMMC 331 of the power module 330 reports the AMC insertion event to the MCMC 311 of the MCH 310 according to the IPMB-0 bus after knowing that the AMC module 340 is in position.

Step 402: The AMC module 340 obtains management power supply from the management power bus, and the MMC module 341 of the AMC module 340 manages the relevant work of circuit power-on.

Step 403: The MMC 341 of the AMC module 340 communicates with the MCMC 311 of the MCH 310 according to the IPMB-L bus, requiring provision of a load power supply of the AMC module 340; and sends the load power supply requirement of the AMC module 340 to the MCMC 311.

Step 404: The MCMC 311 of the MCH 310 checks whether the power resources of the power module 330 are enough for meeting the load power supply requirement of the AMC module 340; if the power resources are enough, according to the IPMB-L bus, the MCMC sends a command that allows provision of load power supply to the MMC module of the AMC.

Step 405: After receiving the command that allows provision of load power supply, the MMC 341 of the AMC 340 sends a load power enabling signal to the load power enabling circuit 343; after receiving the load power enabling signal, the load power enabling circuit 343 enables the load power output, and supplies power to the load circuit 342 of the AMC module 340.

In the system shown in FIG. 4, the in-position signal of each AMC module 340 may be connected to the MCMC 311 of the MCH 310 directly without being connected to the EMMC 331 of the power module 330. In this case, the process of controlling the AMC power supply during insertion of an AMC module differs from the process shown in FIG. 4 only in the following aspects:

After being inserted into a slot, the AMC module 340 declares the in-position state to the MCMC 311 of the MCH 310 according to the in-position signal, without the need of declaring the in-position state to the power module 330. The AMC module 340 reports the AMC insertion event to the MCMC 311 of the MCH 310 according to the IPMB-0 bus.

In this embodiment, the load power supply requirement may be the power required by the load circuit of the AMC module. Moreover, if the management power supply is on, after knowing that the AMC module is in position, the MCMC of the MCH may also query the AMC module whether a load power supply is required. If the MMC of the AMC module determines that a load power supply is required, the AMC module sends a load power supply requirement to the MCMC of the MCH. After receiving the load power supply request, the MCMC of the MCH may send to the MMC of the AMC module a command that allows provision of load power supply directly, without checking whether the power resources of the power module are enough for meeting the load power supply requirement.

Figure 5:
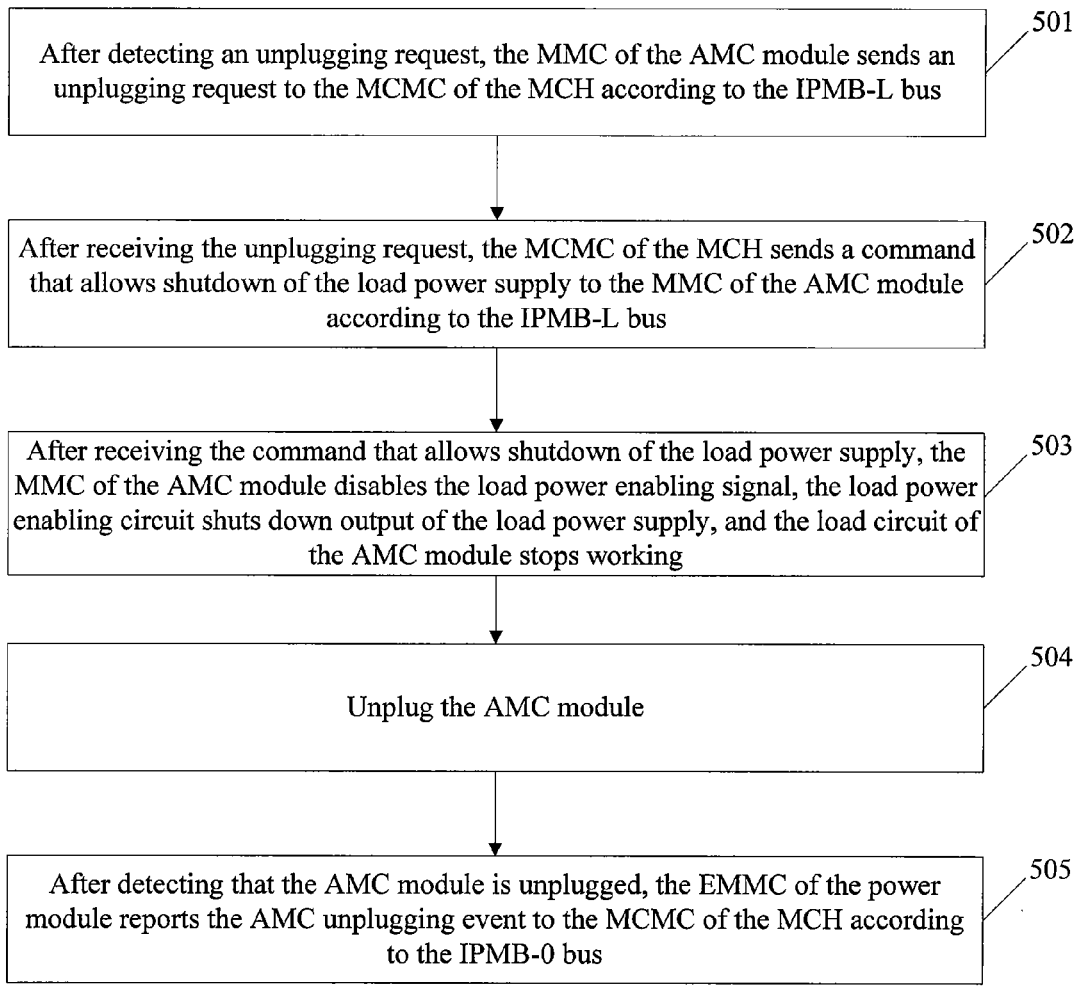
FIG. 5 is a flow chart of the method for managing the power supply of an AMC module in the process of unplugging an AMC module into the system shown in FIG. 3.

FIG. 5 is a flow chart of the method for managing the power supply of an AMC module in the process of unplugging an AMC module into the system shown in FIG. 3. The method includes the following steps:

Step 501: After detecting the unplugging request, the MMC 341 of the AMC module 340 sends an unplugging request to the MCMC 311 of the MCH 310 according to the IPMB-L bus.

Step 502: After receiving the unplugging request, the MCMC 311 of the MCH 310 sends a command that allows shutdown of the load power supply to the MMC 341 of the AMC module 340 according to the IPMB-L bus.

Step 503: After receiving the command that allows shutdown of the load power supply, the MMC 341 of the AMC module 340 disables the load power enabling signal; the load power enabling circuit shuts down output of the load power supply, and the load circuit of the AMC module stops working.

Step 504: Unplugging the AMC module 340.

Step 505: After detecting that the AMC module 340 is unplugged, the EMMC 331 of the power module 330 reports the AMC unplugging event to the MCMC 311 of the MCH 310 according to the IPMB-0 bus.

In this embodiment, the unplugging request detected by the MMC may be sent according to a micro switch (not illustrated) on the AMC module 340. The EMMC 311 may determine whether the AMC module 340 is unplugged (namely, out of position) according to the in-position signal sent by the MMC 341 of the AMC module.

If the in-position signal of each AMC module in the system shown in FIG. 3 is connected to the MCMC of the MCH directly, step 505 of the process in FIG. 5 is omissible.

As illustrated FIG. 3, the system supports the power supply of a bus topology, and has simpler circuit design. The power module of the system avoids the trouble of setting an AMC power control circuit module for each AMC module, simplifies the power module design, and improves the reliability of the power module. The processes in FIG. 4 and FIG. 5 reveal that the system shown in FIG. 3 may simplify the process of controlling the power supply of the AMC module.

Figure 6:
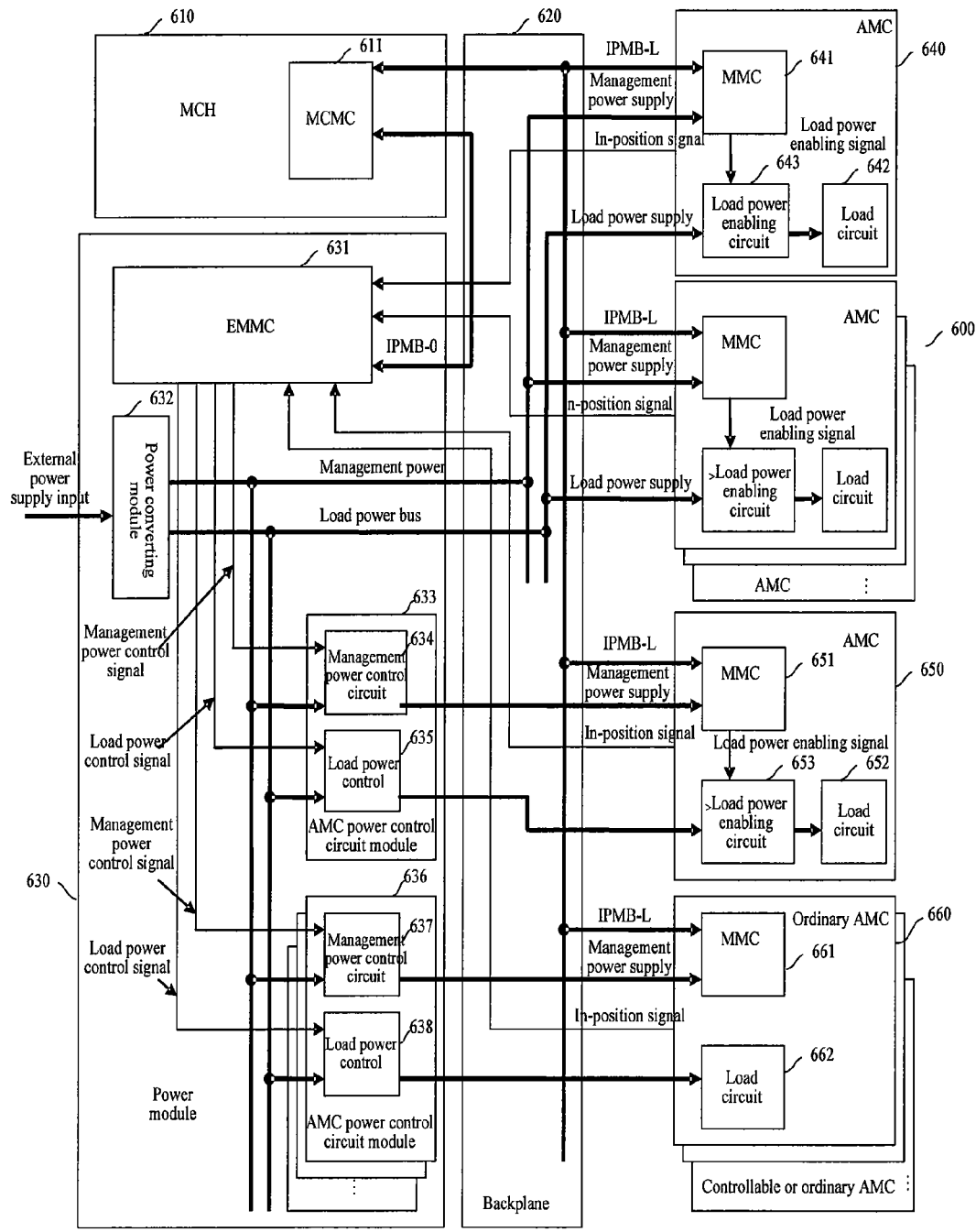
FIG. 6 shows the structure of a power supply system that supports both bus topology and star topology in an embodiment of the present application.

If an ordinary AMC module (namely, an AMC module based on the prior art) needs to be inserted into the system shown in FIG. 3, the insertion mode must be the same as the mode in the prior art. In the power module of the system shown in FIG. 3, an AMC power control circuit module is set for each ordinary AMC module; in the process of plugging and unplugging an ordinary AMC module, the method for controlling the power supply is the same as the method applied in the prior art. In this way, both the power supply of a bus topology and the power supply of a star topology exist in a MicroTCA system. Moreover, the AMC module may be inserted into the slot for the power supply of a bus topology, or into the slot for the power supply of a star topology. An ordinary AMC module can be inserted only into the slot for the power supply of a star topology. FIG. 6 shows the structure of a system that supports both the power supply of a bus topology and the power supply of a star topology in another embodiment disclosed in the present application.

In this embodiment, a power supply system 600 includes: an MCH 610, a power module 630, at least one AMC module 640 or 650, and at least one ordinary AMC module 660. The system differs from the system shown in FIG. 3 in that: at least one ordinary AMC module 660 is added into the power supply system 600; the power module 630 needs to contain at least one AMC power control circuit module 633 or 636 in addition to a power converting module 632 and an EMMC 631; the power converting module 632 receives input of external power supply, and divides the converted power supply into two parts: one part is output to the backplane 620 according to a management power bus and a load power bus to form power supply of a bus topology; and the other part is output to the backplane 620 according to different AMC power control circuit modules 633 or 636 to form power supply of a star topology.

The AMC module 640 or 650 may be inserted into the power supply slot of a bus topology, or into the power supply slot of a star topology; but an ordinary AMC 660 module can be inserted only into a power supply slot of the star topology.

The AMC power control circuit module 633 or 636 includes a management power control circuit 634 or 637 and a load power control circuit 635 or 638. An input side of the management power control circuit 634 or 637 is connected to the EMMC 631, another input side is connected to the management power bus, and the output side is connected to the AMC module 650, or with an MMC 651 or 661 of an ordinary AMC module 660;

An input side of the load power control circuit 635 or 638 is connected to the EMMC 631, another input side is connected to the load power bus, and the output side is connected to the load power enabling circuit 653 of the AMC module 650 or the load circuit 662 of the ordinary AMC module 660.

For an AMC module, the functions of the MMC, EMMC, management power control circuit, and load power control circuit are described below:

The MCH 610 is further adapted to send a command of providing management power supply to the EMMC 631 according to the IPMB-0 bus after receiving the in-position signal from the AMC module 640, check whether the power module 630 is capable of meeting the load power supply requirement of the AMC module 640 after receiving the load power supply request from the MMC 641, and if capable, instruct the MMC 641 of the AMC module 640 to enable the load power enabling signal;

The MMC 641 enables the load power enabling signal, and the load power enabling circuit 643 turns on the load power path according to the received load power enabling signal.

The EMMC 631 is adapted to send the command of providing management power supply to the management power control circuit 634 or 637 of the corresponding AMC power control circuit module 633 or 636 after receiving the command of providing management power supply, enable the load power control signal of the corresponding AMC power control circuit module 633 or 636 when receiving a request of providing load power supply for the AMC module 650 or 660, disable the load power control signal of the corresponding AMC power control circuit module 650 or 660 when receiving the request of shutting down the load power supply of the AMC module 650 or 660, and control the management power control circuit 634 or 637 to shut down output of the management power supply after detecting that the AMC module is unplugged.

The management power supply circuit 634 or 637 is adapted to control the management power supply according to the received command of providing or shutting down the management power supply.

The load power control circuit 635 or 638 is adapted to turn on or shut down output of the load power supply according to the control signal of enabling or disabling the load power supply sent by the EMMC 631.

The functions of an ordinary AMC module, MMC, EMMC, management power control circuit, and load power control circuit are the same as those in the prior art.

Figure 7:
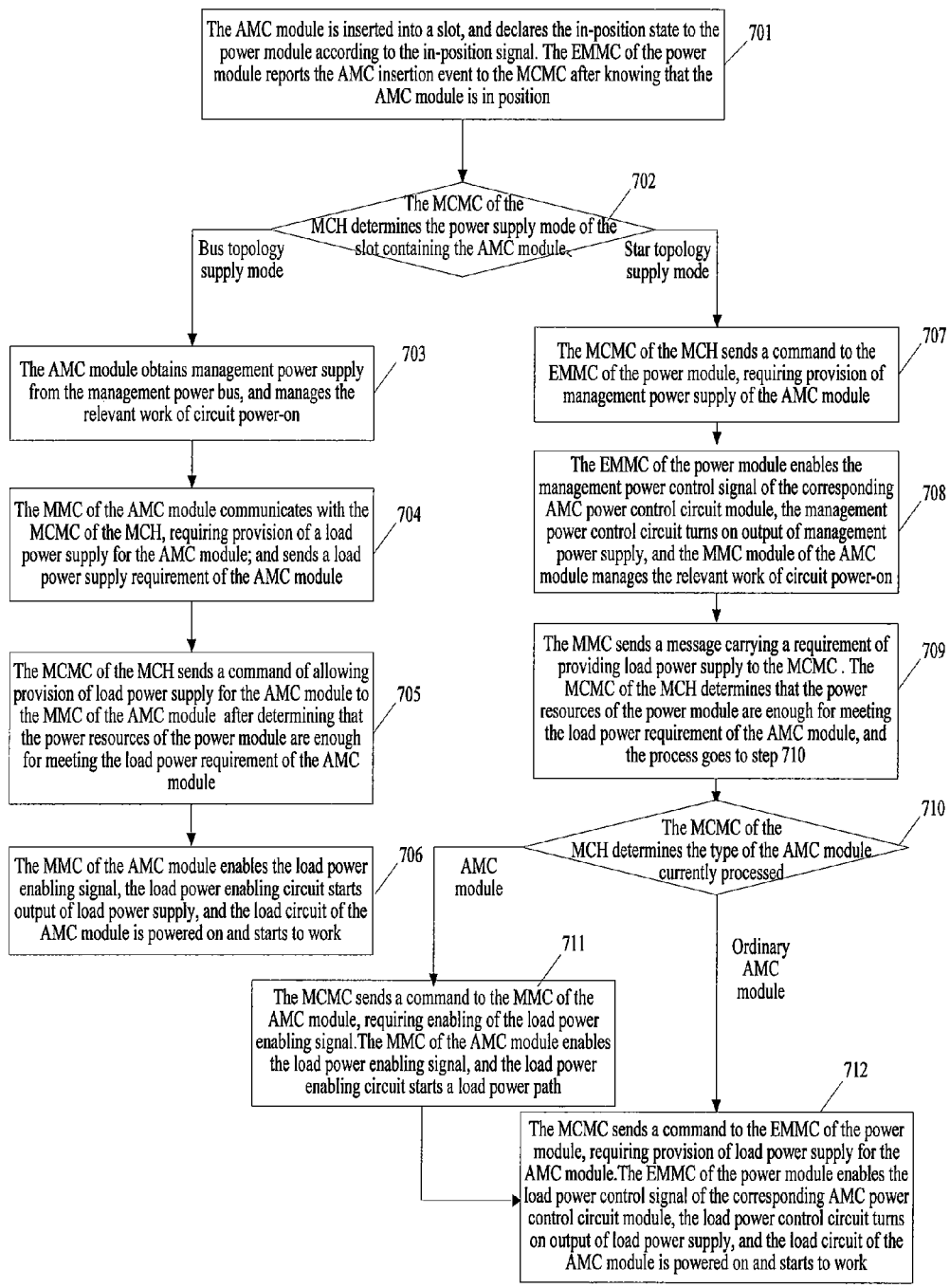
FIG. 7 is a flow chart of the method for managing the process of inserting an AMC module by using the system shown in FIG. 6.

FIG. 7 is a flow chart of the method for managing the process of inserting an AMC module by using the system shown in FIG. 6. The process includes the following steps:

Step 701: The AMC module is inserted into a slot, and declares the in-position state to the power module 630 according to the in-position signal. The EMMC 631 of the power module 630 reports the AMC insertion event to the MCMC 611 of the MCH 610 according to the IPMB-0 bus after knowing that the AMC module is in position.

Step 702: The MCMC 611 of the MCH 610 determines the power supply mode of the slot that contains the AMC module. If the power supply mode is a bus mode, the AMC module must be the AMC module 640 only, and the process proceeds to steps 703-706; if the power supply mode is a star topology mode, the AMC module may be the AMC module 650 or the ordinary AMC module 660, and the process proceeds to steps 707-712.

Step 703: The AMC module 640 obtains management power supply from the management power bus, and the MMC module 641 of the AMC module 640 manages the relevant work of circuit power-on.

Step 704: The MMC 641 of the AMC module 640 communicates with the MCMC 611 of the MCH 610 according to the IPMB-L bus, requiring provision of a load power supply to the AMC module 640; and sends the load power supply requirement of the AMC module 640.

Step 705: The MCMC 611 of the MCH 610 checks whether the power resources of the power module 630 are enough for meeting the load power supply requirement of the AMC module 640; if the power resources are enough, according to the IPMB-L bus, the MCMC sends a command that allows provision of load power supply for the AMC module 640 to the MMC 641 of the AMC module 640.

Step 706: The MMC 641 of the AMC module 640 enables the load power enabling signal, the load power enabling circuit 643 turns on output of load power supply, and the load circuit 642 of the AMC module 640 is powered on to work.

Step 707: According to the IPMB-0 bus, the MCMC 611 of the MCH 610 sends a command to the EMMC 631 of the power module 630, requiring provision of management power supply of the AMC module.

Step 708: The EMMC 631 of the power module enables the management power control signal of the corresponding AMC power control circuit module, the management power control circuit turns on output of management power supply, and the MMC module of the AMC module manages the relevant work of circuit power-on.

Step 709: The MMC of the AMC module communicates with the MCMC 611 of the MCH 610 according to the IPMB-L bus, and the MCMC 611 receives the message from the MMC of the AMC module, the message carrying a requirement of providing load power supply. According to the received load power supply requirement, the MCMC 611 of the MCH 610 checks whether the power resources of the power module 630 are enough for meeting the load power requirement of the AMC module. If enough, the process proceeds to step 710.

Step 710: The MCMC 611 of the MCH 610 determines the type of the AMC module currently processed. If the type is the AMC module 650, the process proceeds to steps 711-712; if the type is the ordinary AMC module 660, the process proceeds to step 712.

Step 711: According to the IPMB-L bus, the MCMC 611 sends a command to the MMC 651 of the AMC module 650, requiring enabling of the load power enabling signal. The MMC 651 of the AMC module 650 enables the load power enabling signal, and the load power enabling circuit 653 turns on a load power path.

Step 712: According to the IPMB-0 bus, the MCMC 611 sends a command to the EMMC 631 of the power module 630, requiring provision of load power supply of the AMC module 660. The EMMC 631 of the power module 630 enables the load power control signal of the corresponding AMC power control circuit module 636, the load power control circuit 638 turns on output of load power supply, and the load circuit 662 of the AMC module 660 is powered on to work.

After knowing that an AMC module is in position, the MCMC 611 of the MCH 610 reads the power topology information pre-stored in the backplane 620 in the system to determine the power supply mode of the slot that contains the AMC module; for example, if the AMC module 640 is inserted, the MCMC 611 determines that the power supply mode of the slot containing the AMC module is a bus topology mode; if the AMC module 650 or 660 is inserted, the MCMC 611 determines that the power supply mode of the slot containing the AMC module is a star topology mode. Moreover, the MCMC 611 of the MCH 610 reads the AMC module type information pre-stored on the MMC of the AMC module to determine whether the currently processed AMC module is an AMC module or an ordinary AMC module.

In the system shown in FIG. 6, the in-position signal of each AMC module may be connected to the MCMC of the MCH directly without being connected to the EMMC of the power module. In this case, the process of controlling the power supply during insertion of an AMC module differs from the process shown in FIG. 7 only in the following aspects:

After being inserted into a slot, the AMC module declares the in-position state to the MCMC of the MCH according to the in-position signal, without the need of declaring the in-position state to the power module. The AMC module reports the AMC insertion event to the MCMC of the MCH according to the IPMB-0 bus.

Figure 8:
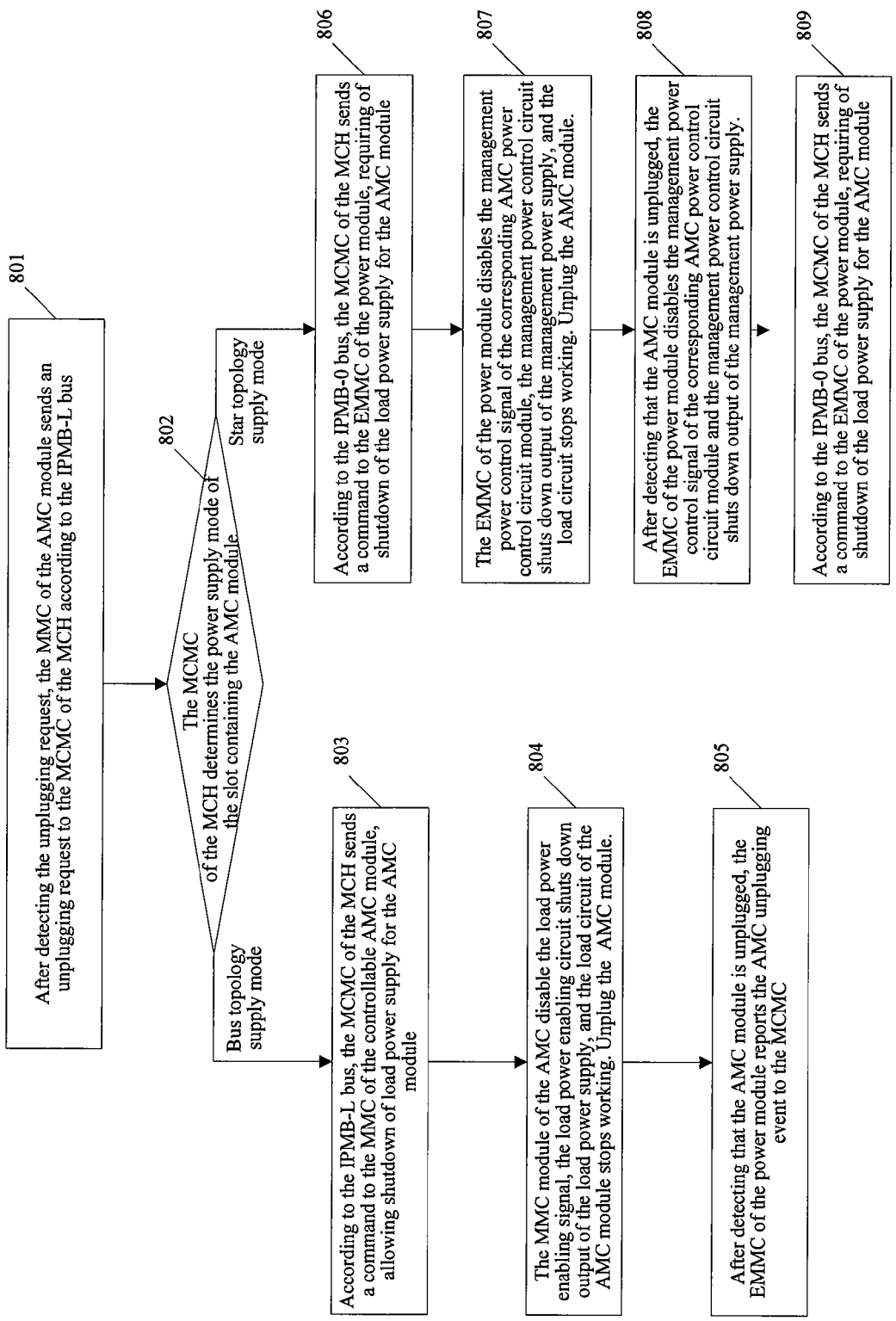
FIG. 8 is a flow chart of the method for managing the process of unplugging an AMC module by using the system shown in FIG. 6.

FIG. 8 is a flow chart of the method for managing the process of unplugging an AMC module by using the system shown in FIG. 6. The process includes the following steps:

Step 801: After detecting the unplugging request, the MMC of the AMC module sends the unplugging request to the MCMC 611 of the MCH 610 according to the IPMB-L bus.

Step 802: The MCMC 611 of the MCH 610 determines the power supply mode of the slot containing the AMC module. If the power supply mode is the bus topology mode, the process proceeds to steps 803-805; if the power supply mode is the star topology mode, the process proceeds to steps 806-809.

Step 803: According to the IPMB-L bus, the MCMC 611 of the MCH 610 sends a command to the MMC 641 of the AMC module, allowing shutdown of load power supply of the AMC module 640.

Step 804: The MMC 641 of the AMC module 643 disables the load power enabling signal, the load power enabling circuit 643 shuts down output of load power supply, the load circuit 642 of the AMC module 640 stops working, and the AMC module 640 is unplugged.

Step 805: After detecting that the AMC module 640 is unplugged, the EMMC 631 of the power module 630 reports the AMC unplugging event to the MCMC 611 of the MCH 610 according to the IPMB-0 bus.

Step 806: According to the IPMB-0 bus, the MCMC 611 of the MCH 610 sends a command to the EMMC 631 of the power module 630, requiring shutdown of the load power supply for the AMC module.

Step 807: The EMMC 631 of the power module 630 disables the load power control signal of the corresponding AMC power control circuit module 633 or 636, the load power control circuit 635 or 638 shuts down output of load power supply, the load circuit 652 or 662 of the AMC module 650 or 660 stops working, and the AMC module 650 or 660 is unplugged.

Step 808: After detecting that the AMC module is unplugged, the EMMC 631 of the power module disables the management power control signal of the corresponding AMC power control circuit module, and the management power control circuit shuts down output of the management power supply.

Step 809: The EMMC 631 of the power module 630 reports the AMC unplugging event to the MCMC 611 of the MCH 610 according to the IPMB-0 bus.

If the in-position signal of each AMC module in the system shown in FIG. 6 is connected to the MCMC of the MCH directly, steps 805 and 809 of the process in FIG. 8 are omissible.

The embodiments described above are exemplary and are not intended to be a limitation on the scope of the claims. It is apparent that those skilled in the art can make various modifications and variations to the exemplary embodiments without departing from the spirit and scope of the claims. The claims are intended to cover the modifications and variations provided that they fall in the scope of protection defined by the following claims or their equivalents.

What we claim is:

1. A power supply system comprising:
   a first controller,
   a power converter, and
   at least one electronic card, wherein the electronic card comprises:
   a second controller,
   a load circuit, and
   a first control circuit;
   wherein the first controller is configured to send a load power supply control command to the second controller according to a received load power supply control request from the second controller;
   wherein the power converter is configured to receive an input of an external power supply, and to provide a load power supply to the first control circuit through a load power bus after converting the input of the external power supply;
   wherein the second controller is configured to send the load power supply control request to the first controller, to receive the load power supply control command sent by the first controller, and to send a load power enabling signal to the first control circuit according to the load power supply control command; and
   wherein the first control circuit is configured to obtain the load power supply provided by the power converter, and to control the load power supply provided to the load circuit of the electronic card according to the load power enabling signal received from the second controller.

2. The power supply system according to claim 1, wherein the second controller is further configured to notify the first controller that the electronic card is in position according to an in-position signal.

3. The power supply system according to claim 1, wherein the power converter is configured to provide a management power supply after converted; and
  wherein the second controller is further configured to obtain the management power supply from the power converter, and to manage relevant circuit power-on work.

4. The power supply system according to claim 3, wherein the power converter comprises a power converting module and an Enhanced Module Management Controller (EMMC), wherein the power converting module is configured to receive the input of the external power supply, and to convert the input of the external power supply into the load power supply and the management power supply, to provide to the first control circuit and the second controller respectively;
  wherein the EMMC is configured to receive in-position signals sent by the electronic card when inserted into the power supply system, and to report an electronic card insertion event to the first controller.

5. The power supply system according to claim 4, wherein, the first controller is further configured to send a command of providing management power supply to the EMMC after receiving the in-position signal of the electronic card;
  wherein the EMMC is further configured to instruct a management power control circuit to provide the management power supply for a corresponding second controller after receiving the command of providing management power supply; to control the management power control circuit to shut down output of the management power supply after detecting that the electronic card is unplugged; to instruct a load power control circuit to provide the load power supply for a corresponding load circuit after receiving a request for providing the load power supply; and to instruct the load power control circuit to shut down an output of the load power supply after receiving a request for shutting down the load power supply;
  wherein the power converter further comprises:
  a management power supply circuit, configured to control the management power supply according to a received command for providing or shutting down the management power supply; and
  the load power control circuit, wherein the load power control circuit is configured to turn on or shut down output of the load power supply according to the command for providing or shutting down the load power supply.

6. The power supply system according to claim 5, wherein the power supply system further comprises at least one ordinary electronic card, the at least one ordinary electronic card comprising the second controller and the load circuit;
  wherein the second controller of the ordinary electronic card is coupled to the management power control circuit, and the load circuit of the ordinary electronic card is coupled to the load power control circuit.

7. The power supply system according to claim 6, wherein the power supply system further comprises a backplane, and the power converter and the first controller are coupled to the at least one electronic card or the at least one ordinary electronic card according to the backplane.

8. The power supply system according to claim 4, wherein the first controller is further configured to query the second controller whether the load power supply is required after knowing that the electronic card is in position; and
  wherein the second controller is further configured to send the load power control request to the first controller after determining that the load power supply is required.

9. A method for supplying power to an electronic card, comprising:
  obtaining, by an electronic card, management power supply from a power converter and managing a relevant circuit of the electronic card power-on work when or after inserting the electronic card into a system by a second controller;
  sending, by the electronic card, a request for providing load power supply to a first controller, wherein the request carries a load power requirement of the electronic card;
  sending by the first controller, a command for allowing provision of a load power supply to the electronic card;
  turning on, by the electronic card, a power supply output for receiving the load power supply provided by a power converter through a load power bus according to the command sent by the first controller;
  wherein sending a command for allowing provision of load power supply to the electronic card comprises:
  sending, by the first controller, the command for allowing provision of the load power supply to the electronic card, after determining that the power converter is able to meet the load power requirement of the electronic card;
  wherein before sending the command for allowing provision of the load power supply to the electronic card, the method further comprises:
  notifying, by the electronic card, the power converter that the electronic card is in position, and reporting, by the power converter, an electronic card insertion event to the first controller after knowing that the electronic card is in position; or
  notifying by the electronic card, the first controller that the electronic card is in position;
  the method further comprising:
  determining, by the first controller, a power supply mode of a slot insert by the electronic card, and after determining that the power supply mode is a star topology supply mode, performing the following steps:
  sending, by the first controller, a command to the power converter, requiring provision of the management power supply for the electronic card;
  providing, by the power converter, the management power supply for the electronic card;
  managing, by the electronic card, the power-on work of the relevant circuit of the electronic card;
  sending, by the electronic card, a request for providing a load power supply to the first controller, carrying a load power supply requirement; instructing, by the first controller, the power converter, to provide load power supply after determining that the power converter is able to meet the load power requirement of the electronic card; and providing, by the power converter, the load power supply for the electronic card according to the command sent by the first controller.

10. The method according to claim 9, further comprising:
  determining, by the first controller, a type of a currently inserted electronic card; if the currently inserted electronic card is the electronic card, instructing the electronic card to turn on a load power path by the first controller.

11. A method for supplying power to an electronic card, comprising:
  obtaining, by an electronic card, management power supply from a power converter and managing a relevant circuit of the electronic card power-on work when or after inserting the electronic card into a system by a second controller;

sending by the electronic card, a request for providing load power supply to a first controller, wherein the request carries a load power requirement of the electronic card;

sending, by the first controller, a command for allowing provision of a load power supply to the electronic card;

turning on, by the electronic card, a power supply output for receiving the load power supply provided by a power converter through a load power bus according to the command sent by the first controller;

the method further comprising:

sending, by the electronic card, an unplugging request to the first controller after detecting the unplugging request in a process of unplugging the electronic card out of the system;

sending, by the first controller, a command for allowing shutdown of the load power supply to the electronic card after receiving the unplugging request;

shutting down, by the electronic card, a load power output after receiving the command that allows shutdown of the load power supply;

the method further comprising:

determining, by the first controller, after an unplugging request is sent to the first controller, a power supply mode of a slot of the electronic card, and if the power supply mode is a star supply mode, performing the following steps:

instructing, by the first controller, the power converter to shut down load power supply;

shutting down, by the power converter, the load power supply provided to the electronic card according to the command;

shutting down, by a power module, the management power supply provided to the electronic card after determining that the electronic card is unplugged.

12. The method according to claim 11, further comprising:

reporting, by the power converter, the electronic card unplugging event to the first controller after determining that electronic card is unplugged according to an in-position signal.

* * * * *